(12) United States Patent
Finck

(10) Patent No.: US 7,992,908 B2
(45) Date of Patent: Aug. 9, 2011

(54) SUCTION DEVICE

(75) Inventor: William Finck, Brentwood (GB)

(73) Assignee: Carglass Luxembourg Sarl-Zug Branch, Zug (CH)

( * ) Notice: Subject to any disclaimer, the term of this patent is extended or adjusted under 35 U.S.C. 154(b) by 39 days.

(21) Appl. No.: 12/089,131

(22) PCT Filed: Oct. 4, 2006

(86) PCT No.: PCT/GB2006/003691
§ 371 (c)(1),
(2), (4) Date: Apr. 3, 2008

(87) PCT Pub. No.: WO2007/039738
PCT Pub. Date: Apr. 12, 2007

(65) Prior Publication Data
US 2010/0164241 A1  Jul. 1, 2010

(30) Foreign Application Priority Data

Oct. 4, 2005 (GB) .................................. 0520208.0

(51) Int. Cl.
*B25J 15/06* (2006.01)
(52) U.S. Cl. .................................. 294/64.1; 248/205.8
(58) Field of Classification Search ............. 294/64.1, 294/15; 248/205.8; 269/21
See application file for complete search history.

(56) References Cited

U.S. PATENT DOCUMENTS

| | | | | |
|---|---|---|---|---|
| 2,127,154 A | * | 8/1938 | Burk | 294/64.1 |
| 2,194,989 A | * | 3/1940 | Torpin | 606/123 |
| 2,212,755 A | * | 8/1940 | Solomon | 294/64.1 |
| 2,287,576 A | * | 6/1942 | Solomon | 294/64.1 |
| 2,474,950 A | * | 7/1949 | Macchesney | 473/127 |
| 4,932,701 A | * | 6/1990 | Cornillier et al. | 294/64.1 |
| 5,405,112 A | * | 4/1995 | Trethewey | 248/205.8 |
| 5,454,540 A | * | 10/1995 | McPherson et al. | 248/362 |
| 5,516,019 A | * | 5/1996 | Moon | 224/324 |
| 5,611,511 A | | 3/1997 | Lee | |
| 5,911,394 A | | 6/1999 | Lee | |
| 6,382,692 B1 | * | 5/2002 | Schmalz et al. | 294/64.1 |

FOREIGN PATENT DOCUMENTS

| | | |
|---|---|---|
| DE | 20103755 U1 | 6/2001 |
| JP | 2000 126014 | 5/2000 |
| WO | WO 93/00549 | 1/1993 |

* cited by examiner

*Primary Examiner* — Dean J Kramer
(74) *Attorney, Agent, or Firm* — Gordon & Jacobson, PC

(57) ABSTRACT

A suction device has a flexible sucker membrane having a peripherally extending skirt, and an actuator arranged to act to reconfigure the sucker between a suction enhanced configuration and a suction released configuration. The actuator is also operable to lift an outer edge of the peripherally extending skirt which enables more convenient release of the suction device than would otherwise be possible.

7 Claims, 2 Drawing Sheets

SUCTION DEVICE

BACKGROUND OF THE INVENTION

1. Field of the Invention

The present invention relates to a suction device, and in particular to a suction device including a flexible suction skirt.

2. State of the Art

Suction devices are known having sucker membrane including a flexible sucker skirt extending from a flexible sucker body. Typically a mounting is provided to locate the sucker body and support a lever actuator arrangement which is manually operable to energize or de-energize the sucker. An exemplary suction device is disclosed, for example, in DE 20103755, in which a lever having a cam is movable to urge a cam follower pin to push down the concave dish of the flexible sucker body, so energizing or de-energizing the suction device. The suction device of DE 20103755 is provided with a lifting tab proximate the radially outer edge of the flexible sucker skirt, and a suction relieving groove on the underside of the flexible sucker membrane. The suction relieving groove aids in releasing the suction device when the lifting tab is lifted.

SUMMARY OF THE INVENTION

An improved arrangement has now been devised.

According to a first aspect, the present invention provides a suction device comprising:
  a flexible sucker having a peripherally extending skirt;
  an actuator operable to both:
    i) apply or release an activating force at a central region of the sucker to reconfigure the sucker between a suction released configuration and a suction applied configuration; and
    ii) lift an outer edge of the peripherally extending skirt.

It is a beneficial feature of the invention that the actuator is operable to both act to activate the suction of the sucker and also act to lift the edge of the sucker membrane. Lifting the edge of the sucker membrane allows air to pass under the edge and aid in release of the sucker device.

It is preferred that the a suction device includes a mounting for mounting the sucker and the actuator.

Beneficially, the actuator comprises a lever, the lever preferably including a cam arrangement to act to apply the force on the sucker to reconfigure the sucker between the suction released configuration and the suction enhanced configuration. Desirably a cam follower is arranged to act to reconfigure the sucker.

In a preferred embodiment, the lever is movable in a first pivotal direction from a neutral position in order to reconfigure the sucker between the suction released configuration and the suction enhanced configuration, the lever being movable in an opposed pivotal direction from the neutral position in order to lift the outer edge of the peripherally extending skirt.

It is preferred that the actuator is connected to an edge lifter linkage extending to a distal portion of the peripherally extending skirt. The edge lifter linkage is desirably guided to be movable in a guide arrangement. In a preferred embodiment, the guide arrangement comprises a guide channel formed in a mounting for the sucker and lever.

According to an alternative aspect, the invention provides a suction device comprising:
  a flexible sucker having a peripherally extending skirt;
  a lever mounted to the sucker;
  the lever operating an elongate lifter element extending to the sucker skirt, the lifter element operable to lift the edge of the skirt upon operation of the lever.

Beneficially, a lifting tab is provided for the skirt, the elongate lifter element being linked to the lifting tab. The elongate lifter element is preferably flexible.

It is preferred that the underside of the sucker membrane includes a suction relieving groove having a relatively wider mouth distal end toward the periphery of the sucker membrane and a relatively narrower proximal end toward the center of the sucker membrane. This has been found to aid in relieving the applied suction when the edge of the flexible skirt is lifted. The groove preferably extends outwardly onto the underside of the peripherally extending skirt, and is beneficially positioned radially in line with the lifting portion of the skirt.

According to a further aspect, therefore, the present invention provides a suction device including a flexible sucker membrane having a peripherally extending skirt, the underside of the sucker membrane including a suction relieving groove having a relatively wider distal end toward the periphery of the sucker membrane and a relatively narrower proximal end toward the center of the sucker membrane.

Desirably, the suction relieving groove tapers from the relatively wider distal end toward the relatively narrower proximal end.

In certain embodiments, devices in accordance with the invention will include a grab handle enabling the device to be used, for example, for lifting. Apparatus in accordance with the invention may make use of a plurality of suction devices, including one or more suction devices according to one or more aspects of the invention. A grab handle may be provided extending between two suction devices. Suction devices may be used for mounting one or more components or apparatus to a surface. For example suction devices according to the various aspects of the invention have utility in the activities of glazing panel replacement and repair for example for use in lifting glazing panels or mounting removal or repair apparatus to glazing panels.

The invention will now be further described, by way of example only, with reference to the accompanying drawings.

DETAILED DESCRIPTION OF THE PREFERRED EMBODIMENTS

Figure 1:
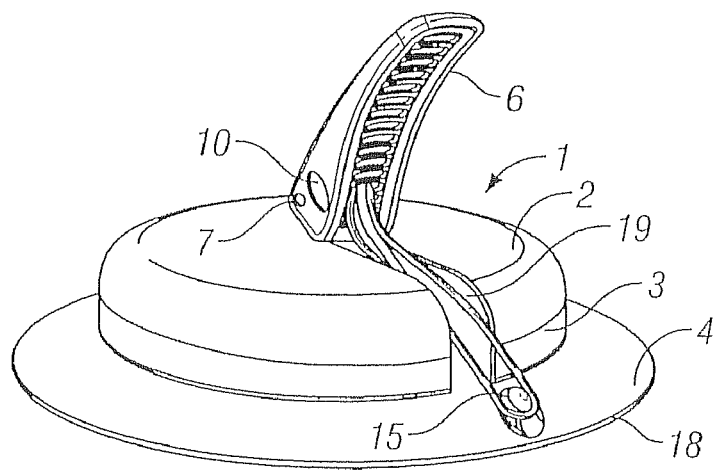
FIG. 1 is a perspective view of a suction device in accordance with the invention.
Figure 2:
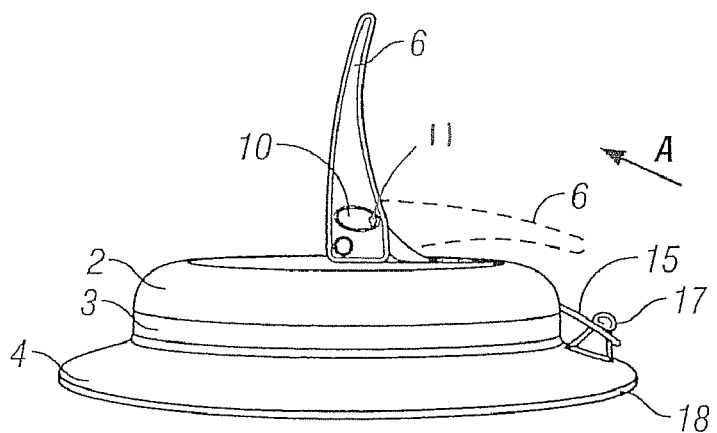
FIG. 2 is a side view of the device of FIG. 1 with the actuator lever in a neutral position.
Figure 3:
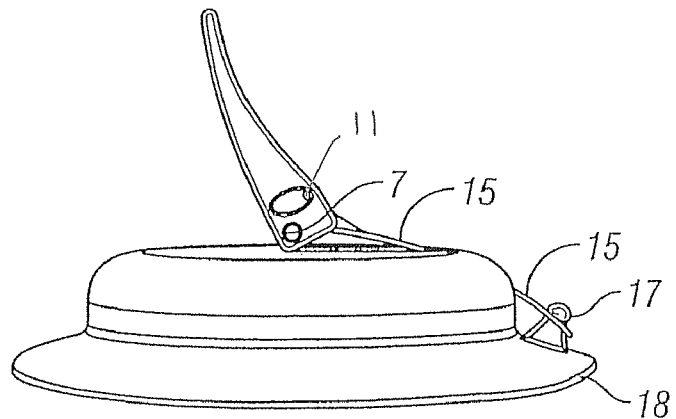
FIG. 3 is a side view of the device of FIG. 1 with actuator lever in suction relief configuration.

Referring to the drawings, and initially to FIGS. 1 to 3, there is shown a sucker device 1 for use in securing to generally gas impermeable surfaces such as, for example, glazing panels, enabling lifting or attachment of other apparatus. The device 1 comprises a hard plastics mounting shell 2, to the underside of which is secured a flexible rubber membrane having a body disc 3 and an integral peripherally extending flexible skirt 4. An actuation lever 6 is pivotally mounted at pivot 7, to the hard plastics mounting shell 2, the primary purpose of the actuation lever being to energize or de-energize the sucker. Such arrangements are known in the art and an exemplary such lever actuator arrangement is disclosed, for example, in DE 20103755, in which a lever having a cam is movable to urge a cam follower pin to push down the concave dish of the flexible sucker body 3, so energizing or de-energizing the suction device. The present arrangement is designed to operate in this manner.

The lever 6 includes an aperture 10 locating a cross pin 11, to which is attached the proximal end of a flexible link tether 15. Flexible link tether 15 is connected at its distal end to a pull tab 17 which is formed integrally with the skirt 4 and projects upwardly therefrom. The purpose of the pull tab 17 is to enable the rim lip 18 of the flexible skirt to be selectively lifted in order to enable full release the suction applied by the device. The present invention enables the lip to be released by means of actuation remote from the rim lip 18. Alternative means may be provided for securing the distal end of the flexible link tether 15 to the portion of the skirt to be lifted. In the embodiment shown, the flexible linkage is received in a guide channel 19 formed in the hard plastics mounting shell 2.

Referring to FIG. 2, the device 1 is shown in with the actuator lever 6 in a neutral position standing upright from the hard plastics mounting shell 2. In this position the vacuum is not fully applied and the rim lip 18 is not being lifted. In the energized configuration, with the actuator lever 6 pivoted forward (as shown in dashed line in FIG. 2), the cam action causes push down of the flexible sucker body 3, so energizing the suction. In this arrangement the underside of the flexible skirt 4 is pressed face down against the substrate surface.

When seeking to release the applied suction, the lever 6 is returned to the neutral position and then pivoted forward over center (as shown in FIG. 3). This has the effect of causing flexible link tether 15 to slide in the direction of arrow A in guide channel 19, pulling upwardly on pull tab 17 and on so doing, lifting the rim lip 18 of skirt 4. This permits air to pass under the skirt and body of the sucker membrane 3, relieving the applied suction. The suction device can then easily be lifted from the substrate surface.

Figure 5:
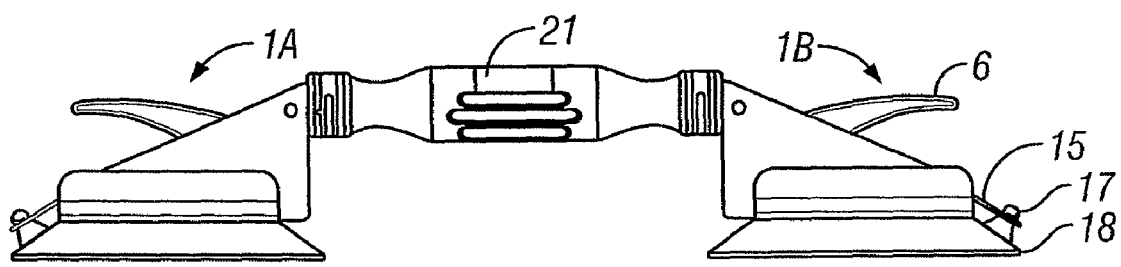

The present invention enables a lever or other actuator to be used to lift the rim lip of the skirt. By making this the primary suction application actuator lever 6, convenient and single handed release actuation may be achieved. The other hand may be used to support the device, for example by means of gripping a grip handle. such an arrangement is shown in FIG. 5, where a grip handle 21 extends between 2 suction devices 1a, 1b in accordance with the invention.

Figure 4:
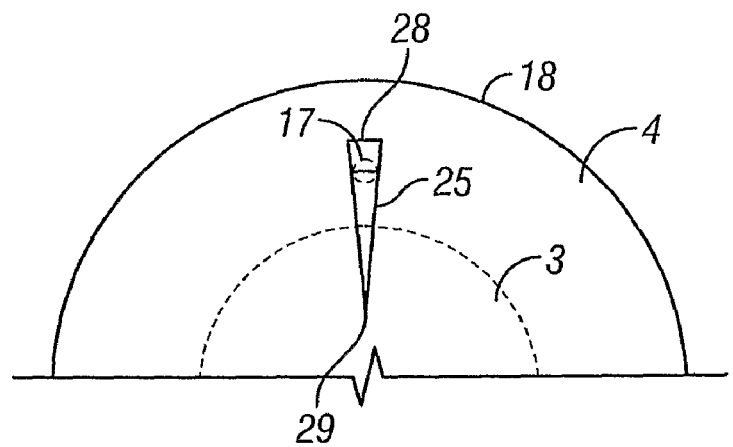
FIG. 4 is a view of the underside of a suction device in accordance with the invention; and, FIG. 5 is a perspective view of two sucker grab handle apparatus in accordance with the invention.

As most clearly shown in FIG. 4, the sucker membrane is provided on its underside (the side arranged to contact the substrate surface) with a suction relieving groove 25 extending across the junction between the flexible skirt 4 and the flexible body 3 of the sucker membrane. The groove 25 provides a conduit enabling rapid pressure equalization when the rim lip 18 is sufficiently lifted. The pressure relieving groove 25 coincides substantially with the position of the lifting tab 17. It has been found that the operation of the pressure relieving groove 25 is enhanced in configurations in which the groove 25 tapers from a relatively wider distal end 28 positioned toward the periphery of the sucker membrane to a relatively narrower proximal end 29 positioned toward the center of the sucker membrane.

Additionally, the arrangement of the invention provides enhanced operation when securing the device to a substrate surface. This is achieved by placing the sucker device on the substrate surface and, with downward pressure applied via the device, first moving the lever 6 to the over-center position (as shown in FIG. 3), with downward force applied via the device to the substrate, before moving the lever 6 all the way forward to the energized position (shown by the dashed line in FIG. 2). The initial over-center movement with downward force applied lifts the skirt 4 and expels air from under the body 3 of the sucker membrane. This results in a greater vacuum effect.

The invention claimed is:

1. A suction device comprising:
   a flexible sucker having a peripherally extending skirt;
   a lever operable to:
   i) apply or release an activating force at a central region of the sucker to reconfigure the sucker between a suction released configuration and a suction enhanced configuration; and
   ii) lift an outer edge of the peripherally extending skirt, wherein the lever is movable in a first pivotal direction from a neutral position in order to reconfigure the sucker between the suction released configuration and the suction enhanced configuration, the lever being movable in an opposed pivotal direction from the neutral position in order to lift the outer edge of the peripherally extending skirt.

2. A suction device according to claim 1, wherein the lever has a first range of movement to apply the activating force to the central region of the sucker, and a second range of movement to lift the edge of the peripherally extending skirt.

3. A suction device according to claim 1, wherein the lever is operable to depress the central region of the sucker.

4. A suction device according to claim 1, including a mounting for mounting the sucker and the lever.

5. A suction device according to claim 1, wherein the lever is connected to an edge lifter linkage extending to a distal portion of the peripherally extending skirt.

6. A suction device according to claim 5, wherein the edge lifter linkage is guided to be movable in a guide arrangement.

7. A suction arrangement according to claim 6, wherein the guide arrangement comprises a guide channel formed in a mounting for the sucker and lever.

* * * * *